United States Patent [19]

Gelain

[11] Patent Number: 4,886,011
[45] Date of Patent: Dec. 12, 1989

[54] POWDER COATING APPARATUS

[75] Inventor: Silvano Gelain, St. Gall, Switzerland

[73] Assignee: Ransburg-Gema AG, Switzerland

[21] Appl. No.: 219,813

[22] Filed: Jul. 14, 1988

Related U.S. Application Data

[63] Continuation of Ser. No. 6,952, Jan. 27, 1987.

[30] Foreign Application Priority Data

Jan. 28, 1986 [DE] Fed. Rep. of Germany ....... 3602388

[51] Int. Cl.⁴ ................................................ B05C 5/00
[52] U.S. Cl. .................................... 118/308; 118/602; 427/182; 34/57 A
[58] Field of Search ............... 118/321, 308, 602, 316, 118/303, DIG. 5; 427/182; 406/136, 137, 138; 366/174; 34/57 A, 170

[56] References Cited

U.S. PATENT DOCUMENTS

| | | | |
|---|---|---|---|
| 1,574,210 | 2/1926 | Spaulding | 34/170 X |
| 2,071,846 | 2/1937 | Lamb et al. | 118/303 |
| 2,509,019 | 5/1950 | Simpson et al. | 34/170 X |
| 2,530,689 | 11/1950 | Egger et al. | 406/144 |
| 3,724,416 | 4/1973 | Diamond et al. | 118/312 X |
| 3,888,423 | 6/1975 | Ganiaris | 34/57 A X |
| 4,288,466 | 9/1981 | Heckman et al. | 427/182 X |
| 4,392,943 | 7/1983 | Euzen et al. | 34/57 A X |
| 4,489,504 | 12/1984 | Hammer | 34/57 A X |
| 4,500,560 | 2/1985 | Guffroy | 118/629 X |
| 4,553,698 | 11/1985 | Parker et al. | 406/136 X |

FOREIGN PATENT DOCUMENTS

3204466A1 10/1982 Fed. Rep. of Germany .

Primary Examiner—Shrive Beck
Assistant Examiner—Alain Bashore
Attorney, Agent, or Firm—Ostrolenk, Faber, Gerb & Soffen

[57] ABSTRACT

A powder coating apparatus fluidizes coating powder in a powder container and mixes with the fluidized powder an additional substance, such as steam, water or other liquid. The additional substance is delivered into the interior of one or a plurality of enclosed bells which extend across the powder container. Each bell has a respective lower opening deep enough into the powder container to be immersed in the fluidized coating powder. The additional substance is delivered under pressure through a tube passing through the bell, through outlet nozzles in the tube and into the bell and then pressurizes the bell to keep the fluidized powder out of the bell and to deliver the additional substance out of the lower opening into the fluidized powder.

16 Claims, 1 Drawing Sheet

POWDER COATING APPARATUS

This is a continuation of application Ser. No. 006,952, filed on Jan. 27, 1987, now abandoned.

BACKGROUND OF THE INVENTION

The invention concerns a powder coating apparatus and particularly means for adding steam or fluid to fluidized powder in the apparatus.

The invention preferably concerns a powder coating apparatus for coating objects with powdered enamel. By means of steam, the powdered enamel is moisturized a desired degree and a desired temperature is maintained within a powder container in which the powdered enamel is held. The powdered enamel is fluidized or maintained in a suspended state by gas delivered from the bottom of the container. Such a powder coating apparatus for powdered enamel is known from U.S. Pat. No. 4,500,560. Although treatment of fluidized powdered enamel is the preferred field of use of the invention, the invention is not limited to powdered enamel nor to the dampening of powdered enamel with steam. Instead of steam, water can be sprayed into the powder container, or a chemical reagent in gaseous, liquid, or powdered form can be mixed with the powder. Powdered plastic can also be used instead of powdered enamel.

SUMMARY OF THE INVENTION

The object of the invention is to uniformly distribute additional fluent substances which are to be fed into the fluidized coating powder, powder-gas mixture, even when the quantity of additional substance to be fed is much smaller than the quantity of coating powder contained in the powder container, for instance a few milligrams of additional substance to several kilograms of coating powder.

According to the invention, the powder coating apparatus includes a device that fluidizes coating powder in a container. Fluidizing is accomplished by delivery of gas into a powder filled space from beneath the powder space. An additional flowable substance is fed into the powder space containing the fluidized coating powder. Usually, that additional substance is steam or liquid, that is, a substance which changes the characteristic of the powder, such as by wetting it.

Delivery of the additional substance into the powder space is accomplished by at least one and more usually a plurality of bells or domes, each of which extends over the length of the powder space, and the plurality of bells are arrayed across the width of the powder space. Each of the bells is generally a closed vessel with a lower opening at its bottom, and that lower opening is immersed in the coating powder in the powder space. The additional substance is fed from the exterior of the apparatus into the upper part of the bell, and from there the substance flows out the lower openings of the bells into the fluidized coating powder. The elevated pressure in the bell displaces any of the fluidized coating powder out of the bell and prevents it from entering into the bell.

The feeding device for the additional substance distributes that substance over the entire length of the bell and preferably over the entire cross-section of the lower opening of the bell.

Feeding of the additional substance into the bell is through a tube which extends along and carries the substance along the long dimension of the bell. That tube has at least one outlet opening and more typically has a plurality of such openings into the bell. Particularly where steam is the additional substance being delivered, each of the outlet openings from the tube comprises a respective nozzle tube which communicates from approximately the radial center of the additional substance delivery tube into the bell. This is particularly useful where steam is being delivered, to keep the water of condensation from also exiting from the tube into the bell. Especially where the additional substance being delivered is liquid or steam, so that there is water of condensation or extra liquid in the tube, the tube is slighty inclined toward a drain, so that excess water or liquid will run off to the drain and not accumulate in the tube.

The bell is preferably enclosed, except for its lower opening. The upper end of the bell is defined by sharply inclined surfaces or walls so that any excess powder falling or settling upon the walls will slide off.

The invention is based on the discovery by the inventor that fluidized powder, i.e. powder in an eddying state of suspension in gas, behaves like water when a pressurized bell or dome is immersed via its lower open end in the fluidized powder. The inventor recognized that the powder-gas mixture of the fluidized powder compresses the air present in the bell without the gas that is fluidizing the powder mixing with the air. The pressure in the bell displaces the fluidized powder out of the bell, so that the surface of the fluidized powder in the bell has a lower level than the surface of the fluidized powder outside of the bell in the powder container. The inventor further discovered that in this manner, the inner cross section of the bell or dome can be used as a large distributor surface through which even the smallest quantities of additional substance can be introduced into the fluidized powder in finely distributed form. A gas nozzle having an opening which is much smaller than the inner cross section of the bell can be considered in comparison to this.

In a special embodiment of the invention, steam can be introduced into the bell via one or several gas nozzles. The steam in the bell is distributed over the entire cross section of the lower outlet opening of the bell before the steam mixes with the fluidized powder at the opening of the bell. A further important discovery of the invention is that between the lower end of the bell, which is provided with the opening of the bell, and the bottom of the container, a particularly strong eddying of the powder particles occurs and thus a particularly strong and uniform mixing of the powder particles in the gas and additionally fed substance in the fluidized powder if the bottom of the container is a so-called fluidization bottom. Such bottoms are known, for instance, from aforesaid U.S. Pat. No. 4,500,560. The fluidization bottom has passage openings for gas so that gas from a pressure gas space located beneath the bottom can pass through the bottom and into the space of the powder container located above it to there eddy and fluidize the powder.

Other objects and features of the invention will be understood from the following description of the invention, with reference to the drawings.

DESCRIPTION OF A PREFERRED EMBODIMENT

Figure 1:
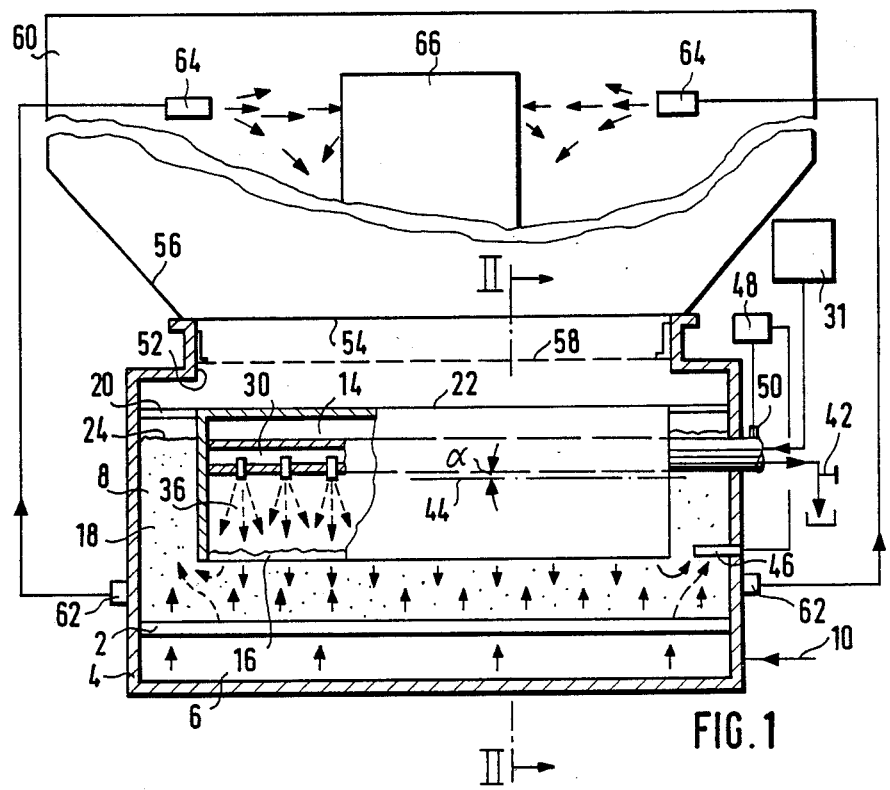
FIG. 1 is a diagrammatic cross section through a powder container of a powder coating apparatus in accordance with the invention.
Figure 2:
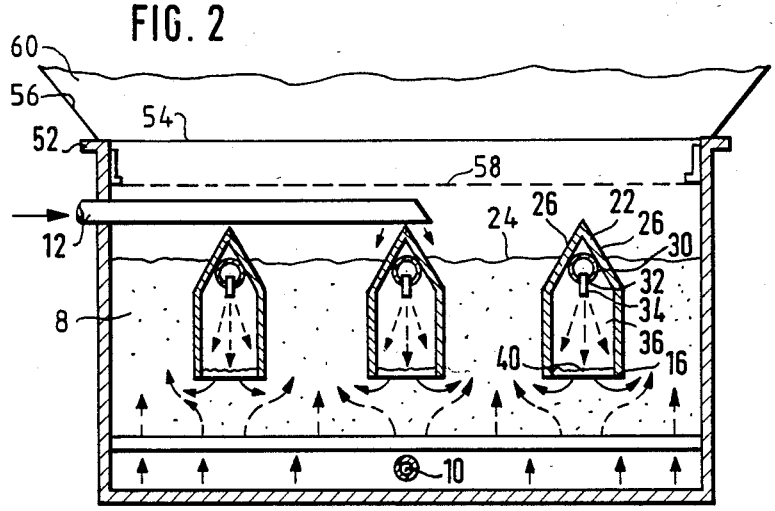
FIG. 2 is a diagrammatic longitudinal section through the powder container of the powder coating apparatus of FIG. 1.

The coating apparatus shown in the drawings serves for coating objects with powdered enamel. The enamel is imparted a certain moisture content and is held at a certain temperature by feeding an additional flowable substance, e.g. steam into a powder container 4.

A fluidizer bottom 2 of container 4 is permeable to gas. Bottom 2 divides the inside of the powder container 4 into a lower, pressure gas space 6 and an upper, powder container space 8. Via feed line 10, the pressure gas space 6 is supplied with gas which flows through the fluidization bottom 2, causing eddying, mixing and holding in a suspended state of the powder that is present in the container space 8. This powder-gas mixture will hereinafter be called "fluidized powder." Fresh powder is fed to the container space 8 via a feed line 12.

A plurality of bells or domes 14 are supported in and arrayed across the width of the container space 8. Each bell extends across the length of the space 8, as shown in FIG. 1. Each bell 14 has a lower opening 16 that extends downward into the fluidized powder 18. Each bell is fastened to the powder container 4 by a holder 20. The bells 14 have a gas-tight bell wall and have the shape of inverted troughs. Instead of the rectangular cross section shown in the drawings, the bells 14 could have a round, square or other shape cross section. The upper ends 22 of the bells extend above the surface 24 of the fluidized powder 18. They have surfaces 26 which extend down from the horizontal at an angle of more than 45° so that powder particles that fall on the surfaces 26 slide off into the bed of fluidized powder 18.

In the upper part of each bell 14 there is a tube 30 which passes completely through it lengthwise. The tube is connected to a source of steam 31. the tube is provided with a plurality of openings 32 on its lower or downwardly facing surface, into which short nozzle tubes 34 are fastened. These tubes extend up into the radial center of the tube 30 and guide steam from there out of the tube 3 into the inside 36 of the bell 14. The steam spreads over the entire cross section of the interior 36 of the bell, produces elevated steam pressure in the bell, and the steam mixes at the opening 16 of the bell with the fluidized powder 18. The elevated pressure in the inner space 36 causes the surface 40 of the fluidized powder at the bottom of the bell to lie substantially lower than its surface 24 in the container space 8, since the fluidized powder 18 behaves like water.

From its outlet opening 32 to a drain device 42 at one end, the tube 30 is inclined at a given angle alpha to a horizontal plane 44 so that water of condensation present in the tube 30 flows to the drain device 42 for removal. Water, instead of steam, may be sprayed into the bell 14 via the pipe 30. Utilizing the slope of the tube 30, the drain device 42 can serve for periodic emptying of the tube 30.

The moisture and temperature prevailing in the fluidized powder 18 can be measured with a measurement probe 46. Depending on the result of the measurement, an adjusting member 50 on the tube 30 can be actuated via a control device 48 to regulatethe feeding of steam from the steam source 31 to the tube 30.

In contrast to the powder container of U.S. Pat. No. 4,500,560, one particular advantage of the invention is that the powder container 4 need not be closed gas-tight. It is thus possible to provide the upper end of the powder container 4 with an opening 52 via which powder can be introduced into the container space 8. Corresponding to the embodiment shown in the drawing, the opening 52 is connected to an opening 54 in the bottom 56 of an article coating booth 60 so that excess powder falls out of the coating compartment 60 directly into the container space 8, without additional devices being required. In the passage between the booth opening 54 and the container opening 52 there is a screen 58 for cleaning and distributing the powder which has fallen down in the booth 60. The fluidized powder 18 is removed from the powder container 4 by an appropriate conveyor means 62 and the appropriately wetted, mixed powder is sprayed on an object 66 to be coated in the compartment 60 by spraying devices 64.

MANNER OF OPERATION

Moisture is added to the fluidized powdered enamel 18 in the container space 8 in order to avoid a back-spray effect on the object 66 which is being coated with powdered enamel. The "back-spray effect" occurs due to back ionization of the powder particles which can occur on the object 66 to be coated. Due to that effect, the powder particles do not adhere to the object 66 but rather are sprayed back from it. See U.S. Pat. No. 4,500,560. The present invention enables precise dosing of moisture directly into the fluidized powder 18. Powdered enamel which has been sprayed from the spray surfaces 67 but has not adhered to the object 66 passes through the vibrating screen 58 into the container space 8. The nozzle tubes 34 remove steam from the tube 30 in its radial center and therefore in the hottest zone. This assures that only steam, and not condensed steam, is conducted from the tube 30 into the bell 14. Condensate that collects in the tube 30 can flow off within the tube 30 to the drain device 42. Because the bells 14 are immersed in the fluidized powder 18, pressure is built up in these bells 14 by which the fluidized powder 18 is displaced from the bells. The tubes 30 are thus free of powder. Steam flowing out of the tube 30 via the nozzle tubes 34 can be introduced unhampered and with pressure into the fluidized powder 18. The bells 14 produce a good, homogeneous mixing of the fluidized powder 18 with the steam. The bells 14 enable the steam-powder mixture to be adjusted much more precisely than with known devices. The pressure gas from the pressure-gas space 6 which flows out of the fluid bottom 2 for the fluidizing of the powder in the container space 8 impinges against the pressure cushion at the opening 16 of each bell 14, whereby an additional eddying of the powder-gas mixture takes place between the container bottom 2 and the bell 14.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A powder coating apparatus, comprising:
   a powder container for holding powder to be fluidized, the container having a perforated bottom;
   means, coupled to the bottom of the powder container, for fluidizing the powder in the powder container;

apparatus for feeding a flowable additional substance into the fluidized coating powder, the apparatus including:

at least one bell disposed in the powder container, the at least one bell having the shape of a closed vessel except for one side thereof which is substantially open to define a contiguous lower opening, the at least one bell being at least partially disposed in the powder container with the lower opening thereof facing the bottom of the container and deep enough therein to be immersed in powder in the container to create an air pocket in the at least one bell whereby the air pocket within the at least one bell is effective for preventing powder from entering into the bell and for maintaining the level of any powder entering the bell lower than the level of the powder outside the bell;

means for supplying the additional substance under pressure;

a feeding device located in the at least one bell, in the air pocket thereof and therefore above the level of powder in the bell, for feeding the additional substance from the supplying means into the air pocket in the at least one bell to enable the additional substance to leave the bell through the lower opening therein and to enter into the fluidized coating powder for mixing therewith.

2. The powder coating apparatus of claim 1, wherein the bell has an upper part away from the lower opening thereof and the feeding device for feeding the additional substance into the bell delivers the additional substance into the upper part of the bell away from the lower opening.

3. The powder coating apparatus of claim 1, wherein the feeding device comprises a distributor for distributing the substance into the bell for the additional substance to be distributed over the entire cross section of the lower opening from the bell.

4. The powder coating apparatus of claim 3, wherein the bell has an upper part away from the lower opening thereof and the feeding device for feeding the additional substance into the bell delivers the additional substance into the upper part of the bell away from the lower opening.

5. The powder coating apparatus of claim 1, wherein the powder container has length and width dimensions and wherein the at least one bell comprises a plurality of bells and each of the bells extends along the length dimension of the container and the bells are spaced from one another and extend across substantially the entire width of the powder container, thereby to deliver additional substance to the fluidized powder over substantially the entire powder container.

6. The powder coating apparatus of claim 5, wherein there are a plurality of the bells.

7. The powder coating apparatus of claim 5, wherein there are a plurality of bells arrayed near one another in an array extending in a first direction across the powder container, and each of the bells has a length across the bell in a direction transverse to the first direction.

8. The powder coating apparatus of claim 1, wherein the powder container has a gas permeable fluid bottom disposed across the container to divide the container into a pressure gas space beneath the bottom into which gas for fluidizing the powder is delivered and a powder space on the other side of the gas permeable fluid bottom into which the powder to be fluidized is delivered, whereby gas from the pressure gas space moves through the bottom into the powder space to fluidize the powder in the powder space.

9. The powder coating apparatus of claim 8, wherein the lower opening of the bell is spaced at a distance above the gas-permeable fluid bottom of the powder container.

10. The powder coating apparatus of claim 1, wherein the bell has an upper end within the powder container, and the upper end of the bell includes inclined surfaces so that powder falling or settling upon the inclined surfaces will slide off into the remaining fluidized coating powder in the powder container.

11. The powder coating apparatus of claim 1 wherein the feeding device in the bell for feeding the flowable addtional substance comprises a tube extending along the length of the bell, and the tube has at least one outlet opening therefrom for delivery of additional substance into the bell.

12. The powder coating apparatus of claim 11, further comprising a drain device connected with the feeding device, the drain device being a tube spaced from the outlet opening from the tube and into the bell, and the tube being inclined from the outlet opening toward the drain device for draining off water of condensation or other liquid in the tube which is not emitted through the outlet opening.

13. The powder coating apparatus of claim 11, wherein each outlet opening from the tube of the feeding device includes a nozzle tube having one end which opens into the bell for delivery of additional substance into the bell and each nozzle tube having another end which opens into the tube away from the interior surface thereof for preventing runout of liquid in the tube through the nozzle tube.

14. The powder coating apparatus of claim 13, wherein the other end of each nozzle tube opens approximately in the radial center of the tube of the feeding device.

15. The powder coating apparatus of claim 1, further comprising a coating chamber for an article to be coated with powder, the coating chamber being disposed above the powder container; means for removing from the powder container powder with which additional substance has been mixed and for delivering the same to the coating chamber for coating an article in the coating chamber; means between the coating chamber and the powder container for passing powder which does not coat the article in the coating chamber through that means and back to the powder container.

16. The powder coating apparatus of claim 15, wherein the bell has an upper end within the powder container, and the upper end of the bell includes inclined surfaces so that powder falling or settling upon the inclined surfaces will slide off into the remaining fluidized coating powder in the powder container.

* * * * *